US010040327B2

(12) United States Patent
Chmelar et al.

(10) Patent No.: US 10,040,327 B2
(45) Date of Patent: Aug. 7, 2018

(54) OSCILLATION CONTROL SYSTEM AND METHOD

(71) Applicant: DEERE & COMPANY, Moline, IL (US)

(72) Inventors: Mark A. Chmelar, Dubuque, IA (US); Francois F. Stander, Dubuque, IA (US)

(73) Assignee: Deere & Company, Moline, IL (US)

( * ) Notice: Subject to any disclaimer, the term of this patent is extended or adjusted under 35 U.S.C. 154(b) by 154 days.

(21) Appl. No.: 15/150,972

(22) Filed: May 10, 2016

(65) Prior Publication Data

US 2017/0326929 A1    Nov. 16, 2017

(51) Int. Cl.
*B60D 1/32* (2006.01)
*G01P 15/00* (2006.01)
*B60D 1/30* (2006.01)

(52) U.S. Cl.
CPC ............... *B60D 1/32* (2013.01); *G01P 15/00* (2013.01); *B60D 1/30* (2013.01)

(58) Field of Classification Search
CPC ............ B60D 1/32; B60D 3/028; G01P 15/00
USPC ........................................................ 280/400
See application file for complete search history.

(56) References Cited

U.S. PATENT DOCUMENTS

| | | | |
|---|---|---|---|
| 4,412,592 A * | 11/1983 | Bergman | ............ B62D 53/0871 180/14.2 |
| 4,469,347 A * | 9/1984 | Gier | ....................... B62D 53/06 280/432 |
| 5,383,680 A | 1/1995 | Bock et al. | |
| 6,116,697 A | 9/2000 | Smith et al. | |
| 6,273,203 B1 | 8/2001 | Paggi et al. | |
| 6,631,773 B1 | 10/2003 | Walker | |
| 6,679,504 B2 | 1/2004 | Delorenzis et al. | |
| 7,770,909 B2 | 8/2010 | Anderson et al. | |
| 7,963,547 B2 | 6/2011 | Anderson | |
| 8,696,010 B2 * | 4/2014 | Toebes | ................... B65G 13/00 280/400 |

(Continued)

FOREIGN PATENT DOCUMENTS

| | | |
|---|---|---|
| JP | S61-57467 A | 3/1986 |
| JP | 09-254831 | * 9/1997 |
| WO | 2009136005 A1 | 11/2009 |

*Primary Examiner* — Joseph M Rocca
*Assistant Examiner* — Marlon A Arce
(74) *Attorney, Agent, or Firm* — Taft Stettinius & Hollister LLP; Stephen F. Rost

(57) ABSTRACT

An oscillation brake system and method is disclosed for a vehicle having front and rear vehicle sections coupled with an oscillation joint that allows rotation about an oscillation axis. The system includes front and rear brake sections rigidly coupled to the front and rear vehicle sections, respectively. The rear vehicle section has multiple degrees of freedom of movement relative to front vehicle section. When the oscillation brake is activated the front brake section engages the rear brake section to increase resistance against or prevent rotation about the oscillation axis. The system can also include sensors, and a controller that activates the system based on the sensor readings. The sensors can include accelerometers, pressure, position, speed or other sensors. The oscillation brake can include a hub splined to separator plates and a housing splined to friction plates, where the oscillation brake is activated to force the separator and friction plates together.

20 Claims, 11 Drawing Sheets

(56) References Cited

U.S. PATENT DOCUMENTS

| | | |
|---|---|---|
| 2001/0044685 A1 | 11/2001 | Schubert |
| 2007/0145609 A1 | 6/2007 | Timoney et al. |
| 2010/0102532 A1 | 4/2010 | Timoney et al. |
| 2014/0222299 A1 | 8/2014 | Stander et al. |
| 2015/0084309 A1* | 3/2015 | Kuboushek .............. B60D 5/00 280/400 |

* cited by examiner

OSCILLATION CONTROL SYSTEM AND METHOD

FIELD OF THE DISCLOSURE

The present disclosure relates to an oscillation control system for a vehicle, and in particular to a system that resists rotation of the front vehicle section relative to a rear vehicle section when the front vehicle section may roll excessively.

BACKGROUND

Certain machines are configured with a frame oscillation feature which allows the front section of the machine to oscillate freely with respect to the back section of the machine. For example, this frame oscillation feature can be found on some machines in the agricultural, forestry, and construction equipment industries. This free oscillation serves the primary function of keeping the wheels of the machine in contact with the ground as the machine is driven across undulating terrain. There can occasionally be instances of machine instability where the front wheels may leave the ground or otherwise be able to roll excessively, which can potentially result in the front frame and cab of the machine tipping over sideways, which can possibly result in property damage and/or personal injury to the operator.

It would be desirable to have an oscillation brake that allows the frame oscillation feature to let the front section of the machine oscillate freely with respect to the rear section of the machine, but in instances of machine instability where the front wheels leave the ground or may otherwise roll excessively the oscillation brake pressurizes and/or locks to prevent the front section of the machine to further oscillate or roll with respect to the back section of the machine, and in instances where the rear section may roll excessively or tip over the oscillation brake unlocks or releases to keep the front section from tipping over with the rear section of the machine.

SUMMARY

An oscillation brake system is disclosed for a vehicle having a front vehicle section coupled to a rear vehicle section with an oscillation joint that allows the front vehicle section to rotate about an oscillation axis relative to the rear vehicle section. The oscillation brake includes a front oscillation brake section rigidly coupled to the front vehicle section, and a rear oscillation brake section rigidly coupled to the rear vehicle section. The rear vehicle section has multiple degrees of freedom of movement relative to front vehicle section including rotation about the oscillation axis. When the oscillation brake is activated the front oscillation brake section engages the rear oscillation brake section causing greater resistance against the front vehicle section rotating about the oscillation axis relative to the rear vehicle section. When the oscillation brake is activated the front oscillation brake section can lock with the rear oscillation brake section to prevent the front vehicle section from rotating about the oscillation axis relative to the rear vehicle section.

The oscillation brake can also include at least one sensor that provides sensor readings regarding the vehicle, and a controller that receives the sensor readings. The controller can activate the oscillation brake based on the sensor readings.

The front vehicle section can include a front frame and an operator cab coupled to the front frame, and the at least one sensor can include an accelerometer that provides accelerometer readings regarding the direction and magnitude of acceleration of the front frame or the operator cab. The front vehicle section can include a front frame, a front axle and a front strut coupling the front frame with the front axle, and the at least one sensor can include a strut sensor providing strut sensor readings regarding a pressure or position of the front strut. The rear vehicle section can include a dump body for carrying material in the rear vehicle section and dumping material from the rear vehicle section, and the at least one sensor can include a dump body position sensor providing position readings regarding the dump body. The front vehicle section can include a front frame, a front axle, a front strut coupling the front frame and the front axle; and the at least one sensor can include an accelerometer that provides accelerometer readings regarding the direction and magnitude of acceleration of the front frame, and a strut sensor that provides strut sensor readings regarding a pressure or position of the front strut. The controller can activate the oscillation brake to lock the front oscillation brake section with the rear oscillation brake section to prevent the front vehicle section from rotating about the oscillation axis relative to the rear vehicle section when the accelerometer readings indicate the front frame is accelerating upward, and the strut sensor readings indicate both of the front struts are extending and/or depressurizing, and the dump body position sensor indicates the dump body is rising, and the ground speed sensor indicates the vehicle ground speed is below a speed threshold.

The front vehicle section can include a front frame, a front axle, a right-side front strut and a left-side front strut, the right-side and left-side front struts coupling the front frame to the front axle. The rear vehicle section can include a rear frame and a rear axle. The at least one sensor can include an accelerometer that provides accelerometer readings regarding the direction and magnitude of acceleration of the front frame, a frame angle sensor that provides frame angle sensor readings regarding the difference between a front axle angle and a rear axle angle, and a ground speed sensor for the vehicle. In this configuration, the controller that activates the oscillation brake to force the front oscillation brake section against the rear oscillation brake section to resist the front vehicle section from rotating about the oscillation axis relative to the rear vehicle section when the accelerometer readings indicate the front frame is accelerating upward, and the frame angle sensor readings indicate the difference between the front axle angle and the rear axle angle is above an angle threshold, and the ground speed sensor indicates the vehicle ground speed is above a speed threshold. The controller can command the oscillation brake to force the front oscillation brake section against the rear oscillation brake section to resist the front vehicle section from rotating about the oscillation axis relative to the rear vehicle section when the frame angle sensor readings indicate the difference between the front axle angle and the rear axle angle is above the angle threshold and increasing. The controller can command the oscillation brake to force the front oscillation brake section against the rear oscillation brake section to resist the front vehicle section from rotating about the oscillation axis relative to the rear vehicle section when the ground speed sensor indicates the vehicle ground speed is above the speed threshold and increasing.

The front oscillation brake section can include an oscillation brake hub splined to one or more separator plates, and the rear oscillation brake section can include an oscillation brake housing splined to one or more friction plates. When the oscillation brake is activated, the oscillation brake hub and the one or more separator plates can be forced against the oscillation brake housing and the one or more friction plates to cause greater resistance against the front vehicle section rotating about the oscillation axis relative to the rear vehicle section. The oscillation brake hub and the one or more separator plates can be forced against the oscillation brake housing and the one or more friction plates by hydraulic pressure, by spring pressure, or by other methods.

An oscillation control method is disclosed for a vehicle having a front vehicle section and a rear vehicle section coupled by an oscillation joint allowing the front vehicle section to rotate about an oscillation axis relative to the rear vehicle section, where the rear vehicle section has multiple degrees of freedom of movement relative to front vehicle section. The oscillation control method includes receiving vehicle sensor readings; determining if the front vehicle section requires stabilization based on the vehicle sensor readings; and when the front vehicle section requires stabilization, activating an oscillation brake to resist rotation of the front vehicle section about the oscillation axis relative to the rear vehicle section. The activating the oscillation brake step can include locking the oscillation brake to prevent rotation of the front vehicle section about the oscillation axis relative to the rear vehicle section.

The front vehicle section can include a front frame, a front axle, a front strut coupling the front frame to the front axle; and the receiving vehicle sensor readings step can include receiving accelerometer readings regarding the direction and magnitude of acceleration of the front frame, and receiving strut sensor readings regarding a pressure or position of the front strut. The rear vehicle section can include a dump body for carrying material in the rear vehicle section and dumping material from the rear vehicle section; and the receiving vehicle sensor readings step can include receiving dump body position sensor readings regarding the dump body, and receiving vehicle ground speed readings for the vehicle. The determining if the front vehicle section requires stabilization step can include determining if the accelerometer readings indicate the front frame is accelerating upward, and the strut sensor readings indicate both of the front struts are extending and/or depressurizing, and the dump body position sensor readings indicate the dump body is rising, and the vehicle ground speed readings indicate the vehicle ground speed is below a speed threshold.

The front vehicle section can include a front frame and a front axle; and the rear vehicle section can include a rear frame and a rear axle. The receiving vehicle sensor readings step can include receiving accelerometer readings regarding the direction and magnitude of acceleration of the front frame, receiving front axle angle readings regarding an angle of the front axle, receiving rear axle angle readings regarding an angle of the rear axle, and receiving vehicle ground speed readings for the vehicle. The determining if the front vehicle section requires stabilization step can include computing a frame angle based on the difference between the front axle angle readings and the rear axle angle readings; and determining if the accelerometer readings indicate the front frame is accelerating upward, and the frame angle is above an angle threshold, and the vehicle ground speed readings are above a speed threshold. The activating an oscillation brake step can include increasing resistance to rotation of the front vehicle section about the oscillation axis relative to the rear vehicle section as a function of the magnitude of the difference between the frame angle and the angle threshold and as a function of the magnitude of the difference between the vehicle ground speed readings and the speed threshold.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
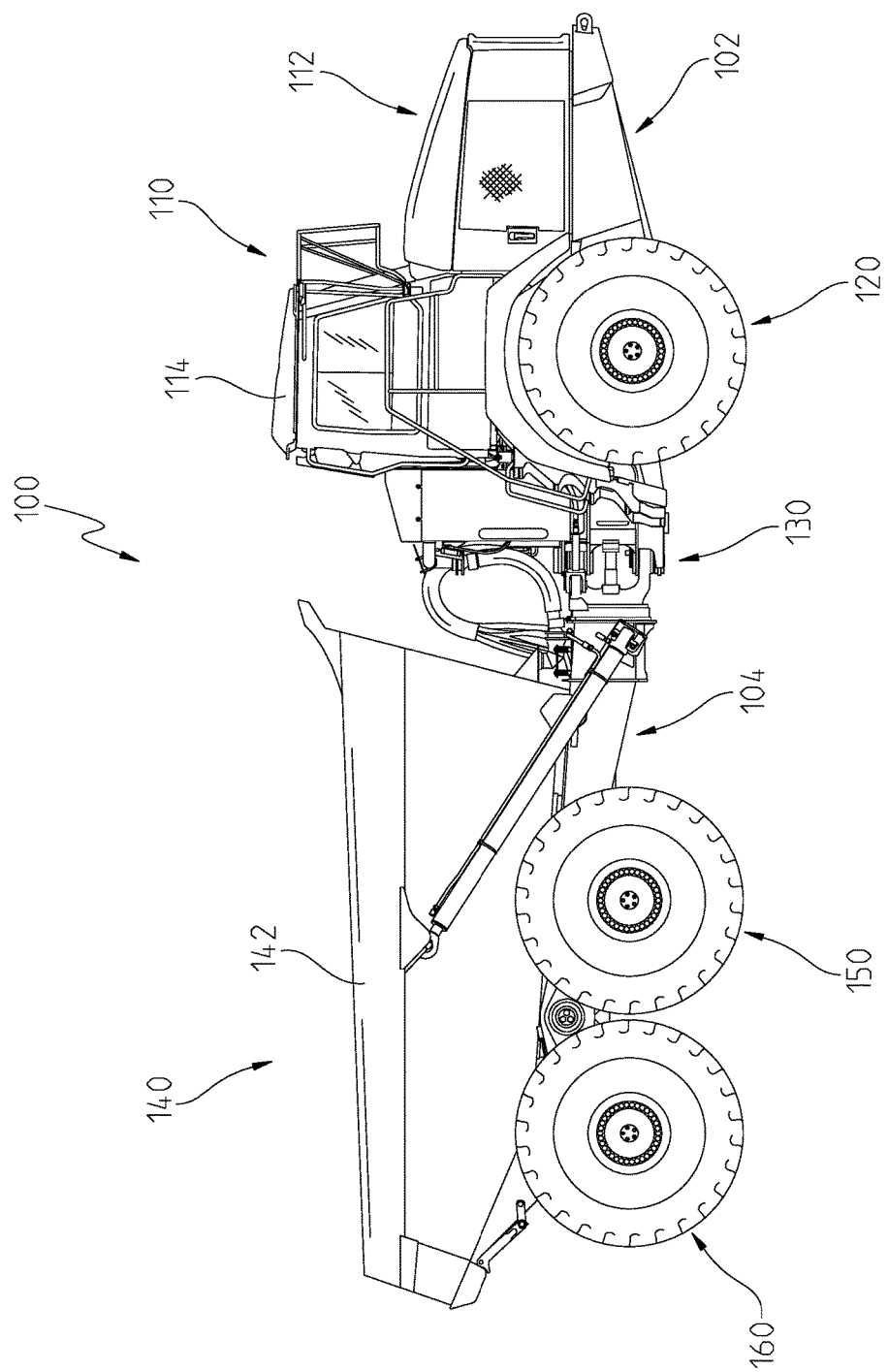
FIG. 1 illustrates an exemplary machine having a frame oscillation feature.

FIG. 1 illustrates an exemplary machine, a dump vehicle 100, including a power head section 110, a load carrying section 140 and an oscillation and articulation joint 130 coupling the power head section 110 to the load carrying section 140. The power head section 110 includes a vehicle engine or motor 112, an operator cab 114 and a front axle and wheels 120 which are all coupled to a front frame 102. The load carrying section 140 includes a dump body 142, a mid-axle and wheels 150 and a rear axle and wheels 160 which are all coupled to a rear frame 104. The oscillation and articulation joint 130 provides multiple degrees of freedom of movement between the front frame 102 of the power head section 110 and the rear frame 104 of the load carrying section 140. The oscillation joint allows the power head section 110 and the load carrying section 140 to rotate relative to one another about a longitudinal axis extending along the length of the vehicle 100. The articulation joint allows the power head section 110 and the load carrying section 140 to pivot relative to one another about a vertical axis for steering the vehicle 100.

Figure 2:
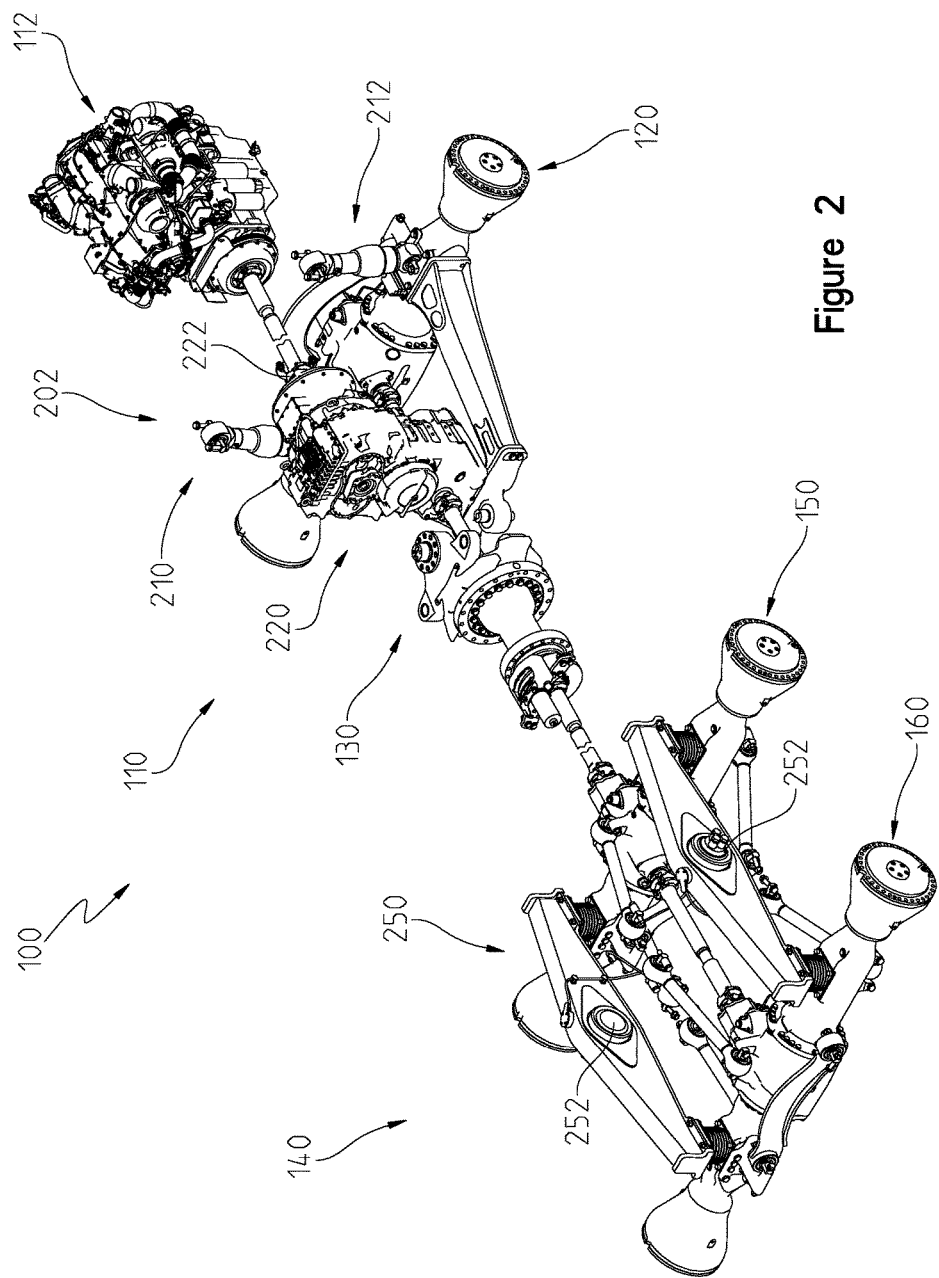
FIG. 2 illustrates exemplary front and rear axle arrangements and suspension system for the machine shown in FIG. 1.

FIG. 2 illustrates exemplary front and rear axle arrangements and suspension system for the dump vehicle 100. The exemplary embodiment of FIG. 2 shows the front axle 120 coupled to a front axle suspension system 202 which is coupled to the front frame 102, and a bogie axle arrangement 250 which is coupled to the rear frame 104. FIG. 2 also shows a transmission 220 coupling the output of the engine 112 to the front and rear axles 120, 150, 160. A transmission output speed sensor 222 can be used to measure the output speed of the transmission 220. The front axle suspension system 202 includes left and right struts 210, 212 that couple the front axle 120 to the front frame 102. In this embodiment, the mid-axle 150 and the rear axle 160 are connected in the bogie axle arrangement 250, and the bogie axle arrangement 250 is connected by a bogie pivot joint 252 to the rear frame 240. The bogie pivot joint 252 is located between the mid-axle 150 and the rear axle 160. The bogie pivot joint 252 of the bogie axle arrangement 250 allows the mid-axle 150 and the rear axle 160 to pivot about an axis running through the bogie pivot joint 252 that is perpendicular to the rear frame 104 which enables the mid and rear axles and wheels 150, 160 to have a different inclination angle than the rear frame 104.

Figure 3:
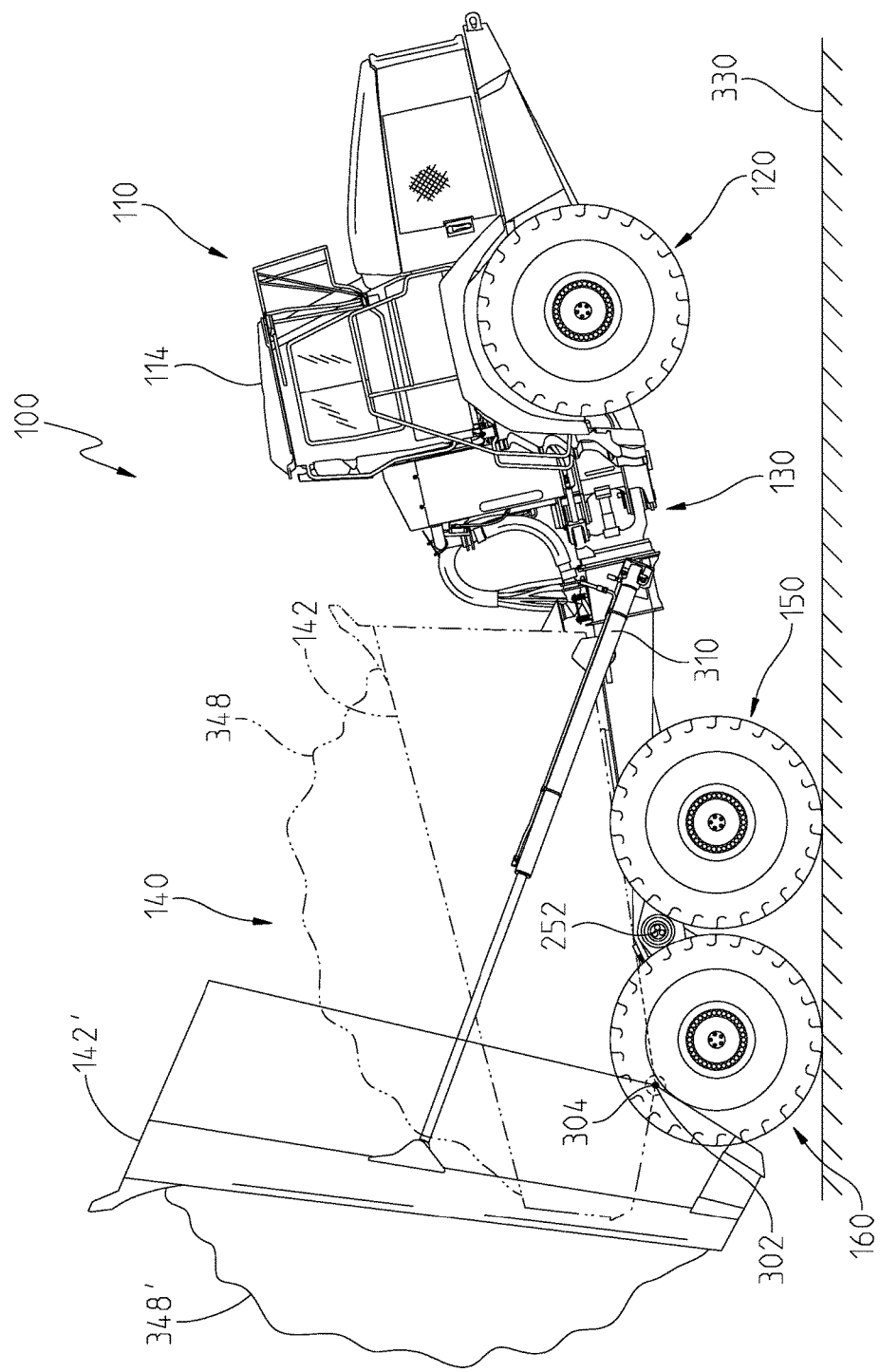
FIG. 3 illustrates a dump vehicle unloading its payload and lifting the power head section off the ground.

FIG. 3 illustrates the dump vehicle 100 being lifted off the ground 330 when the dump body 142 carrying material 348 is lifted to an unloading position of the dump body 142' and material 348'. The dump body 142 is connected to the rear frame 240 at a dump pivot joint 302 and by hydraulic cylinders 310 (one on each side of the dump body 142) which each has a proximal end and a distal end. The dump pivot joint 302, which is behind the rear wheels 160, connects the dump body 142 to the rear frame 104 near the distal end of the rear frame 104. The proximal ends of the hydraulic cylinders 310 are connected to the rear frame 104 nearer the proximal end of the rear frame 104 and the distal ends of the hydraulic cylinders 310 are connected to the dump body 142 on each side. The hydraulic cylinders 310 can be extended to pivot the dump body 142 about the dump pivot joint 302 to the dumping position 142' to dump material 348' from the dump body 142'. The hydraulic cylinders 310 can also be retracted to position the dump body 142 along the rear frame 104 to generally maintain the material 348 in the dump body 142 of the load carrying section 140. A dump body position sensor 304 can be used to measure the angular position of the dump body 142 relative to the rear frame 104. The dump body position sensor 304 can be located on or near the dump pivot joint 302 connecting the dump body 142 to the rear frame 104.

Under certain conditions, during unloading of material from the dump body 142, the front wheels 120 can be lifted off the ground. For example, the front wheels 120 can be lifted off the ground 330 when the vehicle 100, as shown in FIG. 3, is dumping, positioned at dump body 142', and a load 348' (for example, a frozen mass of damp clay) sticks to the dump body 142' with the vehicle 100 angled so that the power head section 110 faces up the incline 330. It is also possible for this to happen when a load 348' is stuck to the dump body 142 during dumping, when positioned at dump body 142', on an incline or when other conditions occur where the center of gravity of the payload shifts back behind the bogie axle 252. When the center of gravity of the payload shifts behind the bogie axle 252, the distal end of the rear frame 104 (furthest from the oscillation joint 130) pivots down behind the bogie pivot axle 252 and the second rear axle 160 which lifts the proximal end of the rear frame 104 (closest to the oscillation joint 130) which can lift the power head section 110 which lifts the front axle and wheels 120 off the ground.

Figure 4:
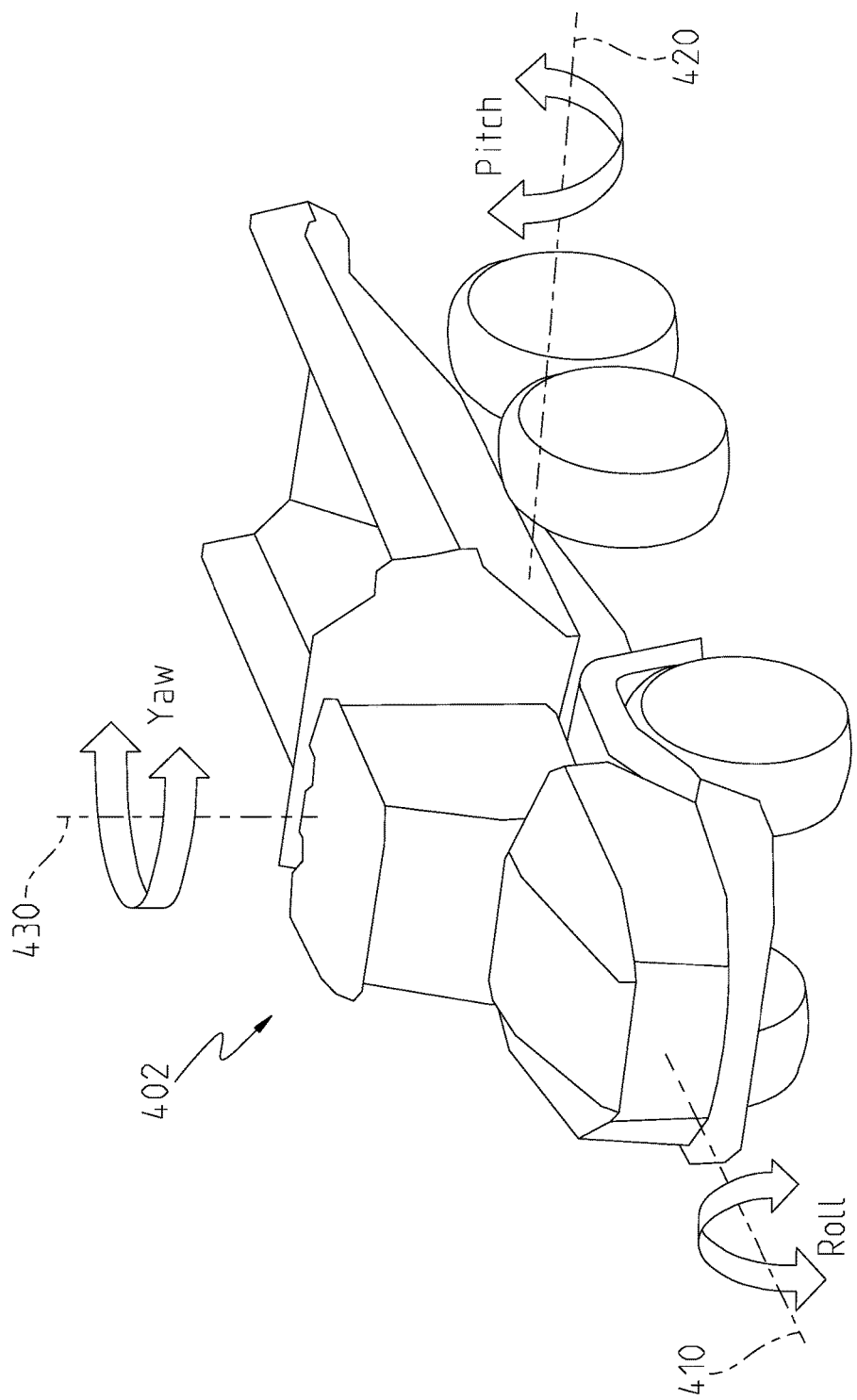
FIG. 4 illustrates the three different types of rotation (roll, pitch and yaw) for a vehicle in three dimensions.

For clarity, FIG. 4 illustrates the three different types of rotation for a vehicle 402 in three dimensions. The vehicle 402 is traveling along a longitudinal axis 410 and rotation about the longitudinal axis 410 is called roll. A lateral axis 420 is perpendicular to the longitudinal axis 410 and passes through the center of gravity of the vehicle 402. Rotation about the lateral axis 420 is called pitch. For a ground vehicle, the longitudinal and lateral axes 410, 420 are generally parallel to the ground. A perpendicular axis 430 is perpendicular to the plane formed by the longitudinal and lateral axes 410, 420 and passes through the center of gravity of the vehicle 402. Rotation about the perpendicular axis 430 is called yaw. The longitudinal, lateral and perpendicular axes 410, 420, 430 all pass through the center of gravity of the vehicle 402.

Figure 5:
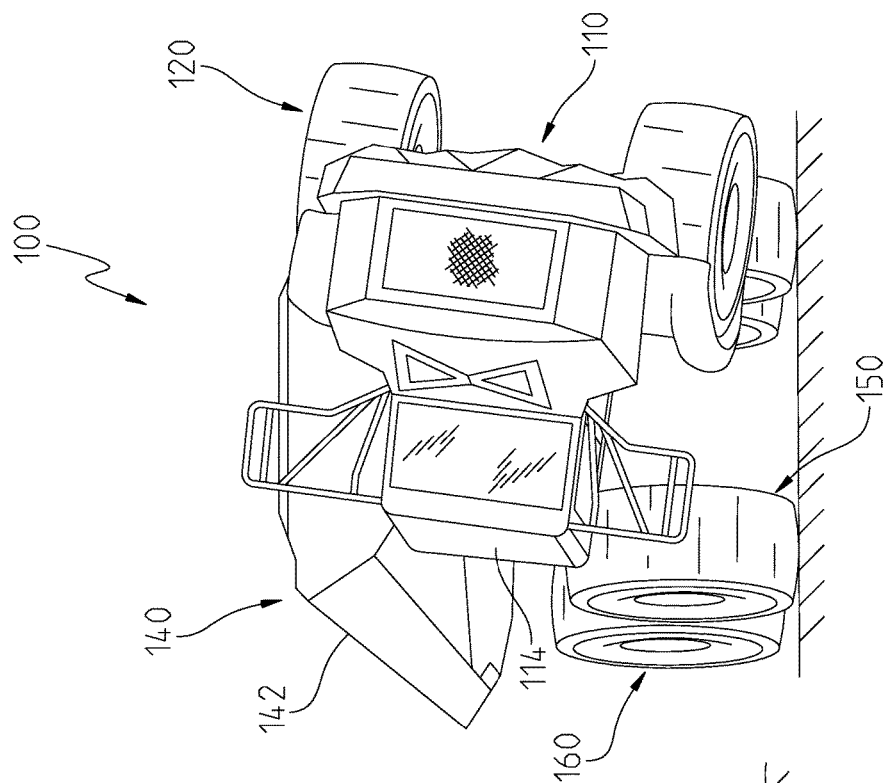
FIG. 5 depicts a vehicle traversing uneven terrain, and shows how the oscillation joint permits the power head section to roll about a longitudinal axis relative to the load carrying section and keep all wheels on the ground.
Figure 6:
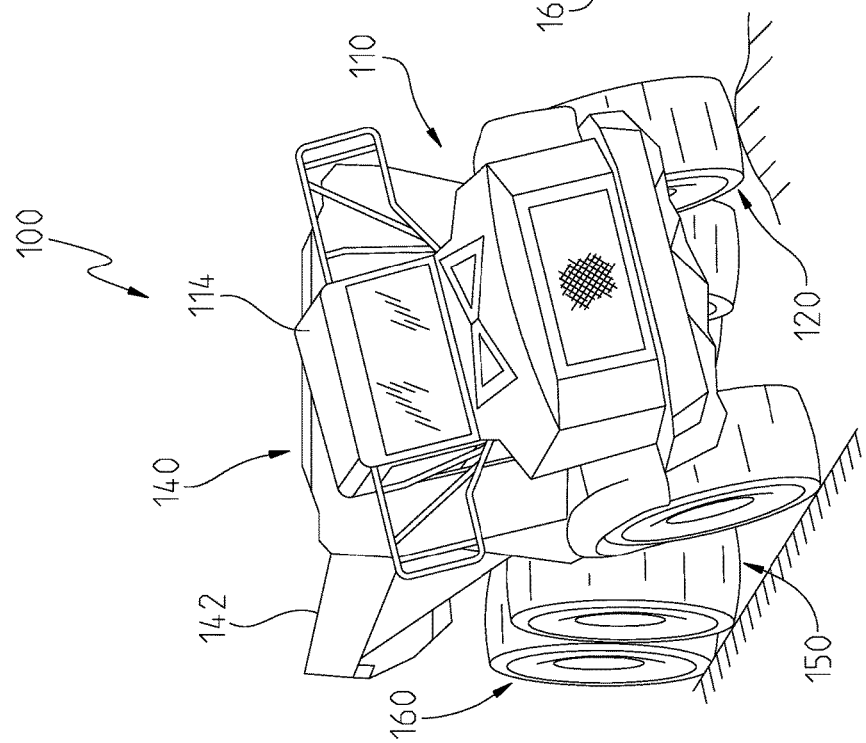
FIG. 6 depicts a vehicle with the dump body raised, and the center of gravity of the payload shifts to lift the power head section and front wheels off the ground, and the power head section rolling to one side on the oscillation joint.

Since the power head section 110 is connected to the load carrying section 140 by the oscillation joint 130, the power head section 110 can roll about the longitudinal axis 410 relative to the load carrying section 140. FIG. 5 depicts the vehicle 100 traversing uneven terrain, and shows how the oscillation joint permits the power head section 110 to roll about the longitudinal axis 410 relative to the load carrying section 140 and keep all six wheels 120, 150, 160 on the ground. This is a normal operating function of the oscillation joint 130. FIG. 6 depicts the vehicle 100 with the dump body 142 raised, and the center of gravity of the payload shifts behind the bogie axle 252 which lifts the power head section 110 with the operator cab 114 and front wheels 120. Without oscillation control, when the front axle is lifted far enough off the ground that the front wheels 120 no longer contact the ground, the oscillation joint 130 can allow the power head section 110 with the operator cab 114 to flip over or roll on their side as shown in FIG. 6 which can result in damage to the vehicle 100 and, under certain circumstances, can be dangerous for the operator. An oscillation brake can prevent the sideways rotation (roll with respect to the load carrying section 140) of the power head section 110 and operator cab 114 shown in FIG. 6.

Figure 7:
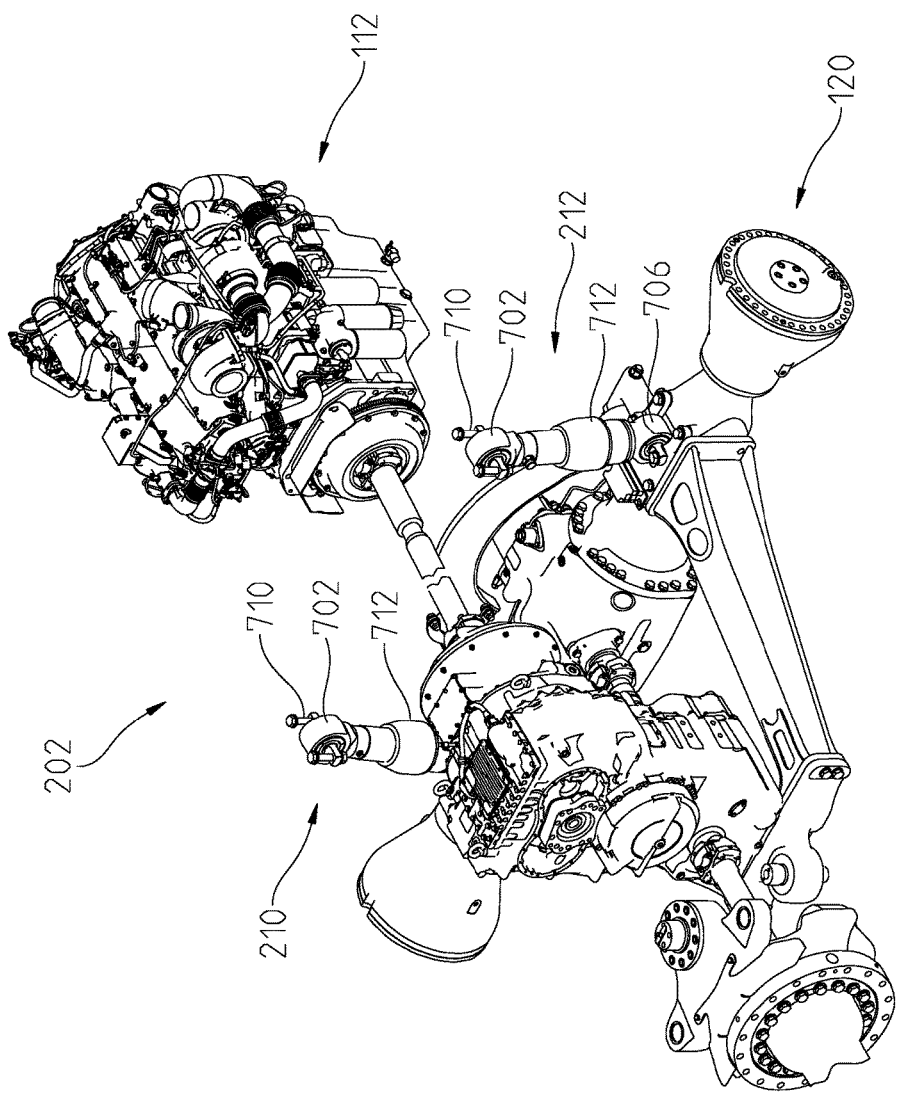
FIG. 7 illustrates the front struts which are part of the suspension system of the power head section of a vehicle.

FIG. 7 shows the front struts 210, 212 which are part of the suspension system of the power head section 110 of the vehicle 100. Each of the front struts 210, 212 includes a proximal end 702 and a distal end 706. The proximal ends 702 of the struts 210, 212 are coupled to the front frame 102 and cab 114. The distal ends 706 of the struts 210, 212 are coupled to the front axle 120. The front struts 210, 212 are compressed by the weight of the components of the power head section 110 on the proximal end of the front struts 210, 212, and the front struts 210, 212 are extended when the weight of the components of the power head section 110 are lifted off the proximal end of the front struts 210, 212. Each of the struts 210, 212 can include an accelerometer 710 and a position and/or pressure sensor 712. The accelerometers 710 can detect upward acceleration of the front frame 102 and the cab 114 relative to the front axle 120. The accelerometer 710 can be coupled to another component of the power head section 110 that would be lifted prior to rolling of the cab 114. The accelerometers 710 can also act as inclinometers to provide an angle relative to gravity and/or to each other to indicate an unstable situation. If the sensors 712 include pressure sensors, the sensors 712 can detect pressurization and depressurization of the front struts 210, 212. If the sensors 712 include position sensors, the sensors 712 can detect extension and compression of the front struts 210, 212.

Additional sensors like those discussed above or other types of sensors can also be coupled to the struts 210, 212 or other parts of the vehicle 100 to determine when to lock and/or unlock the oscillation brake. Some additional sensor examples are provided herein.

Multiple pressure, strain, or displacement sensors could be used on the left and right sides of the machine 100 to gauge stability risks. GPS receivers could provide three-dimensional positions of various vehicle components which could be taken together to determine vehicle positions and potential stability risks. Rotation sensors could be coupled to vehicle components that rotate about the oscillation joint to provide relative rotational angles of the components, and when the relative angle of rotation exceeds a threshold angle, then the oscillation brake could be set. Suspension displacement sensors could measure the length of the front suspension struts, and when both struts are seen to extend fully during a dump operation the oscillation brake could be set. Angle or displacement sensors could be coupled between the walking beams and the rear frame to provide displacement or rotation of the walking beam and when it is sensed that the rear frame is tilting upward, the oscillation brake can be applied. The walking beams are the beams on both sides in the bogie axle arrangement 250 that connect the rear axles 150, 160 and that pivot at the bogie pivot joint 252. A vision system could be coupled to the machine, for example facing forwards or backwards, to monitor the surrounding environment, and the vision system readings could be used to make a judgement about the pitch and/or roll angle of the machine 100, or alternatively to make a judgement about the perceived "roughness" of the approaching terrain. The oscillation brake could be applied based upon the vision system readings, and/or the vision system readings could be used to alert the system controller about oncoming changes in the terrain, which could then allow the oscillation brake to be applied pre-emptively and only when needed. A vehicle speed sensor (for example, ground speed measuring radar, GPS, transmission output speed, wheel speed, etc.) could provide a vehicle ground speed, and when the ground speed exceeds a pre-determined threshold, the oscillation brake could be applied to aid in suspension performance.

Figure 8:
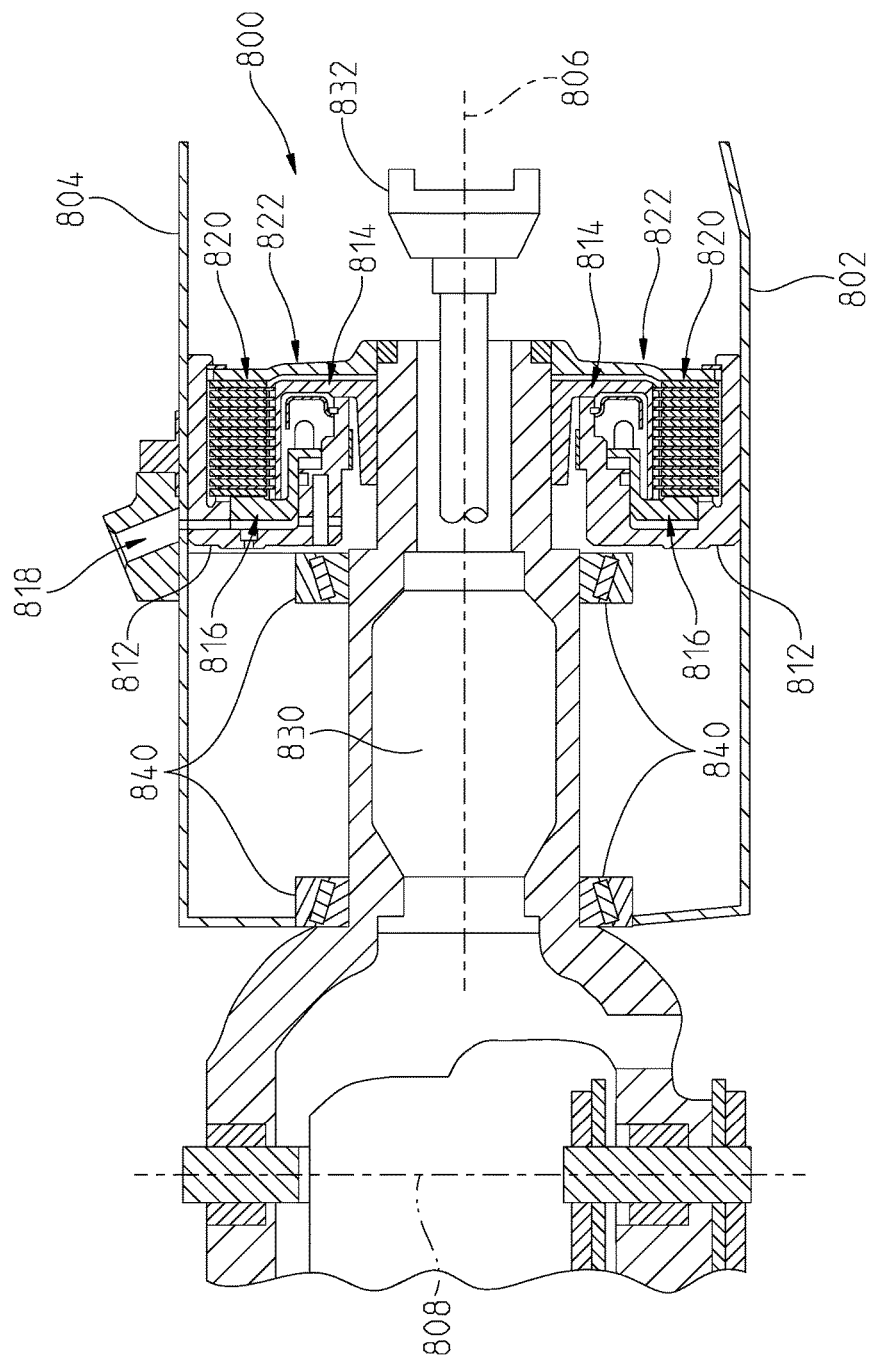
FIG. 8 illustrates an exemplary embodiment of an oscillation brake coupled to an oscillation casting.

FIG. 8 illustrates a cross-section of an exemplary embodiment of an oscillation brake 800 using a hydraulic pressure-applied brake. FIG. 8 illustrates an articulation axis 808 between the front frame 102 and the rear frame 104, the front frame 102 being to the left and the rear frame 104 being to the right in FIG. 8. FIG. 8 also illustrates an oscillation axis 806 about which the oscillation joint 130 enables rotation of the front frame 102 relative to the rear frame 104. The oscillation brake 800 is coupled to an oscillation casting 830 that can help prevent the power head section 110 of a machine from tipping or rolling excessively, for example when the front wheels 120 are lifted off the ground.

FIG. 8 illustrates the oscillation casting 830, a drive shaft 832, oscillation bearings 840 and a lower frame rail 802 and an upper frame rail 804 of the rear frame 104. The oscillation bearings 840 are rigidly attached to the lower and upper frame rails 802, 804 of the rear frame 104. The oscillation casting 830 includes the oscillation joint 130, and the oscillation casting 830 is rigidly attached to the front frame 102. The drive shaft 832 passes through, and is supported by the oscillation casting 830. The oscillation bearings 840 are used to couple the oscillation casting 830 to the lower and upper frame rails 802, 804 of the rear frame 104. The oscillation bearings 840 allow the oscillation casting 830 to rotate about the oscillation axis 806 relative to the rear frame 104.

The oscillation brake 800 includes an oscillation brake housing 812, an oscillation brake hub 814, an oscillation brake piston 816, an oscillation brake pressure cavity 818, an oscillation brake pack 820 and an oscillation brake cover 822. The brake pack 820 is comprised of one or more separator plates alternating with one or more friction plates. The separator plates of the oscillation brake pack 820 are splined to the oscillation brake hub 814 which is fixedly attached to the front frame 102. Each of the friction plates of the oscillation brake pack 820 is splined to the oscillation brake housing 812 which is fixedly attached to the lower and upper frame rails 802, 804 of the rear frame 104. When the oscillation brake 800 is applied, hydraulic force is applied through the oscillation brake pressure cavity 818 onto the oscillation brake piston 816 to compress the oscillation brake pack 820 against the brake cover 822 which compresses the separator plates and friction plates together in the oscillation brake pack 820. The forcing and compressing together in the oscillation brake pack 820 of the separator plates (fixedly connected to the front frame 102 through the oscillation brake hub 814) and the friction plates (fixedly connected to the rear frame 104 through the oscillation brake housing 812) prevents roll of the front frame 102 relative to the rear frame 104. Applying the oscillation brake 800 prevents the oscillation casting 830 from rotating within the oscillation bearings 840, about the oscillation axis 806 relative to the rear frame 104. Thus, applying the oscillation brake 800 prevents roll of the power head section 110 (attached to the front frame 102) about the oscillation axis 806 relative to the rear frame 104.

Figure 9:
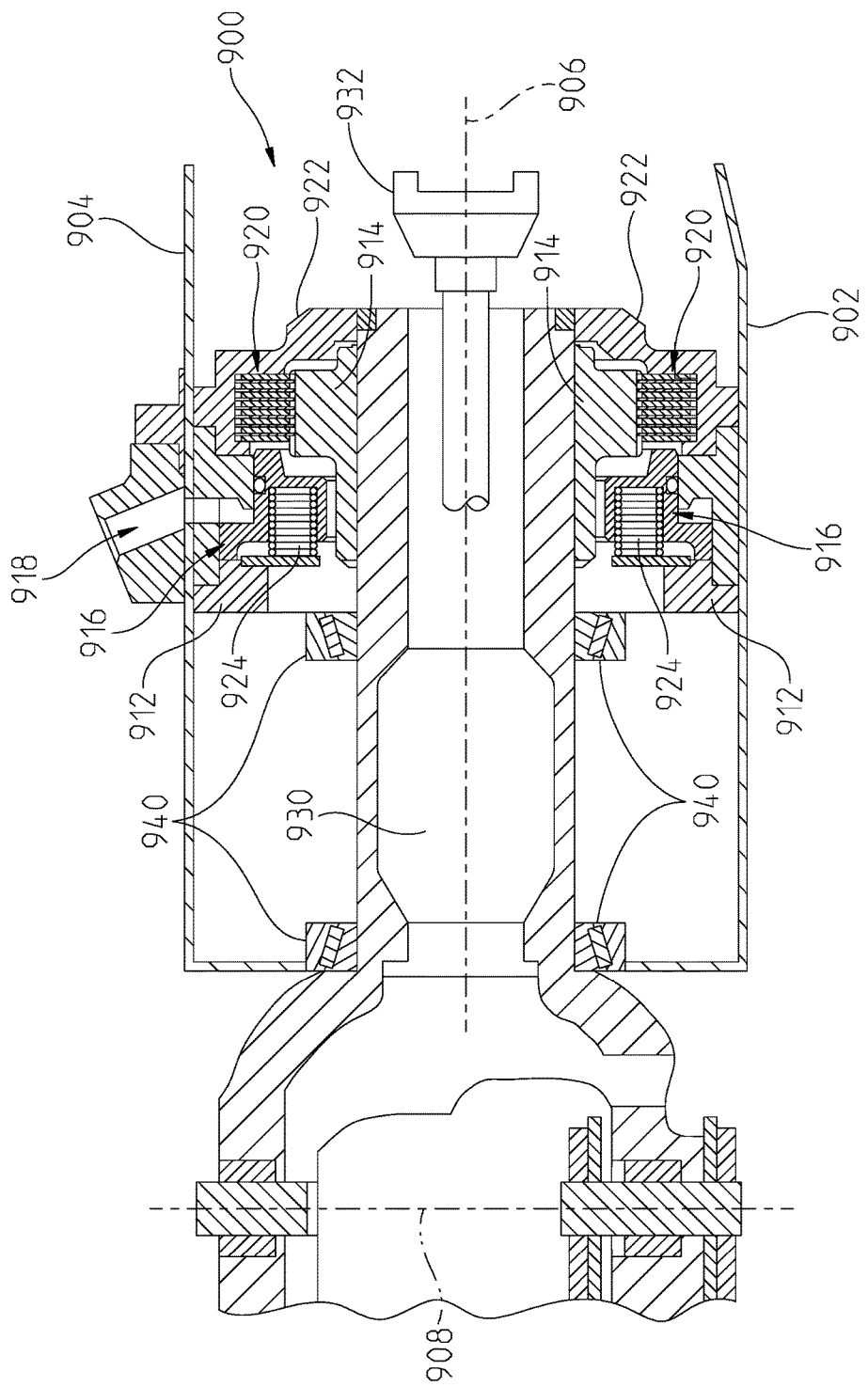
FIG. 9 illustrates another exemplary embodiment of an oscillation brake coupled to an oscillation casting.

FIG. 9 illustrates a cross-section of an exemplary embodiment of an oscillation brake 900 using a spring-applied, hydraulic released brake. FIG. 9 illustrates an articulation axis 908 between the front frame 102 and the rear frame 104, the front frame 102 being to the left and the rear frame 104 being to the right in FIG. 9. FIG. 9 also illustrates an oscillation axis 906 about which the oscillation joint 130 enables rotation of the front frame 102 relative to the rear frame 104. The oscillation brake 900 is coupled to an oscillation casting 930 that can prevent the power head section 110 of a machine from tipping or rolling excessively, for example when the front wheels 120 are lifted off the ground.

FIG. 9 illustrates the oscillation casting 930, a drive shaft 932, oscillation bearings 940 and a lower frame rail 902 and an upper frame rail 904 of the rear frame 104. The oscillation bearings 940 are rigidly attached to the lower and upper frame rails 902, 904 of the rear frame 104. The oscillation casting 930 includes the oscillation joint 130, and the oscillation casting 930 is rigidly attached to the front frame 102. The drive shaft 932 passes through, and is supported by the oscillation casting 930. The oscillation bearings 940 are used to couple the oscillation casting 930 to the lower and upper frame rails 902, 904 of the rear frame 104. The oscillation bearings 940 allow the oscillation casting 930 to rotate about the oscillation axis 906 relative to the rear frame 104.

The oscillation brake 900 includes an oscillation brake housing 912, an oscillation brake hub 914, an oscillation brake piston 916, an oscillation brake pressure cavity 918, and an oscillation brake pack 920, an oscillation brake cover 922 and one or more oscillation brake springs 924. The brake pack 920 is comprised of one or more separator plates alternating with one or more friction plates. The separator plates of the oscillation brake pack 920 are splined to the oscillation brake hub 914 which is fixedly attached to the front frame 102. The friction plates of the oscillation brake pack 920 are splined to the oscillation brake housing 912 which is fixedly attached to the lower and upper frame rails 902, 904 of the rear frame 104. The oscillation brake piston 916 is spring loaded by the oscillation brake spring 924 to compress the oscillation brake pack 920 against the brake cover 922 which compresses the separator plates and friction plates together in the oscillation brake pack 920. When the oscillation brake 900 is not being applied, hydraulic force is applied through the oscillation brake pressure cavity 918 onto the oscillation brake piston 916 to compress the oscillation brake spring 924 and release, or not compress the separator plates and friction plates in the oscillation brake pack 920. When the oscillation brake 900 is applied, the hydraulic force is removed from the oscillation brake piston 916 and the oscillation brake spring 924 forces the oscillation brake piston 916 towards the oscillation brake cover 922 which compresses the oscillation brake pack 920 in-between, which compresses the separator plates and friction plates together in the oscillation brake pack 920. The forcing and compressing together in the oscillation brake pack 920 of the separator plates (fixedly connected to the front frame 102 through the oscillation brake hub 914) and the friction plates (fixedly connected to the rear frame 104 through the oscillation brake housing 912) prevents roll of the front frame 102 relative to the rear frame 104. Applying the oscillation brake 900 prevents the oscillation casting 930 from rotating within the oscillation bearings 940, about the oscillation axis 906 relative to the rear frame 104. Thus, applying the oscillation brake 900 prevents roll of the power head section 110 (attached to the front frame 102) about the oscillation joint 130 relative to the rear frame 104.

Other brake configurations besides those shown in FIGS. 8 and 9 could also be used for an oscillation brake. By way of example and not limitation, wet or dry cone brakes, disc brakes, band brakes, "dog-type"-"jaw-type" locking devices could be used. The brake application force can be controlled by a computer-controlled hydraulic valve.

Figure 10:
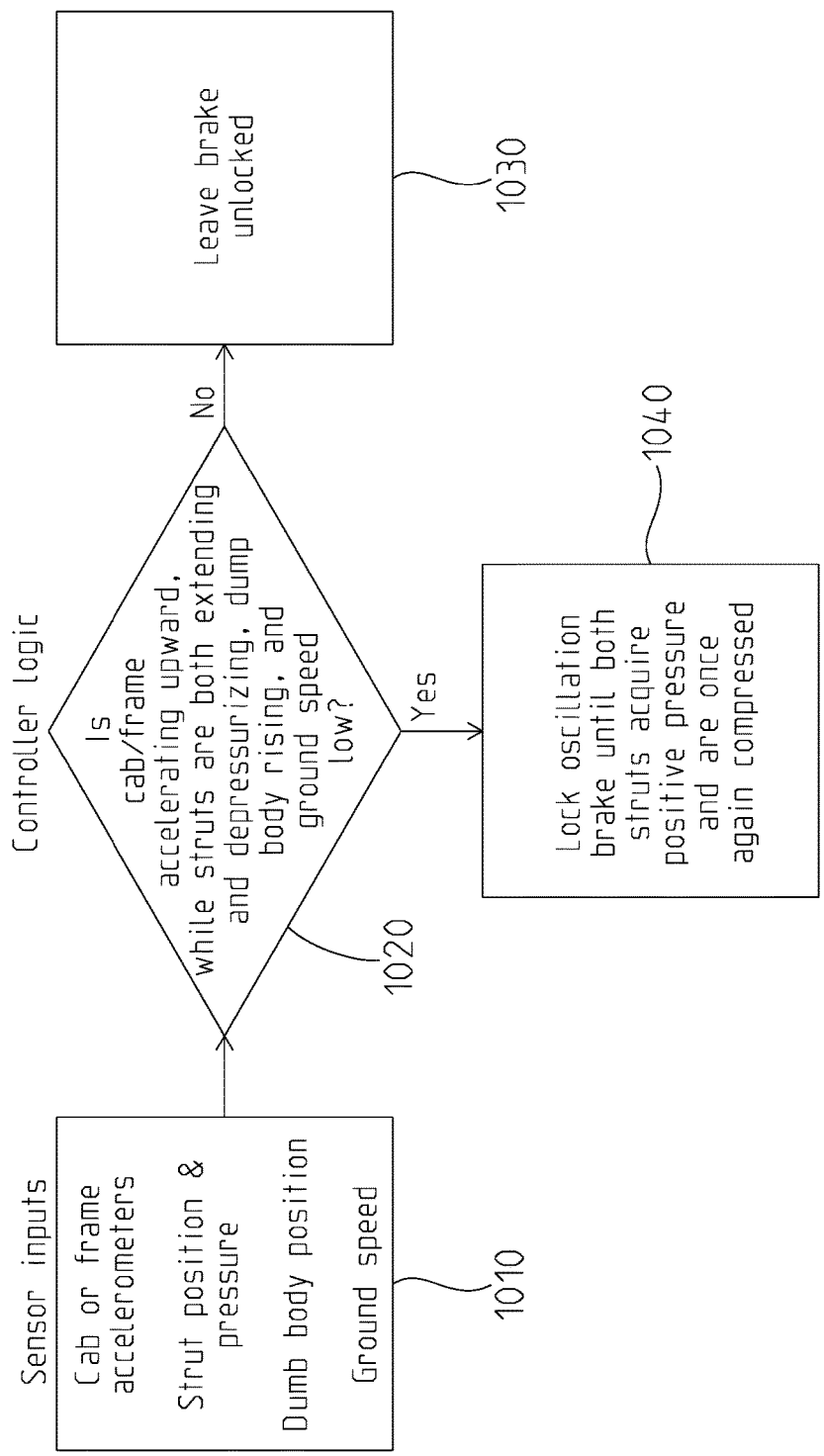
FIG. 10 illustrates a flow diagram for power head section stabilization of a vehicle while dumping.

FIG. 10 illustrates a flow diagram for power head section stabilization of a vehicle while dumping. At block 1010 the controller receives sensor inputs which can include, for example, accelerometer readings for a component of the power head section 110 that would be lifted, for example the accelerometers 710; front strut position and/or pressure sensor readings, for example the sensors 712; dump body position readings, for example dump body position sensor 304; and ground speed readings for the vehicle. At block 1020; based on the sensor inputs, the controller determines if the power head section 110 is accelerating upward while the front struts 210, 212 are extending and depressurizing, and the dump body 142 is rising and the ground speed of the vehicle 100 is below some speed threshold. If all of these conditions are met, then at block 1040, the controller locks the oscillation brake until the front struts 210, 212 acquire positive pressure and begin to compress. If all of these conditions are not met, then at block 1030, the controller leaves the oscillation brake unlocked.

Figure 11:
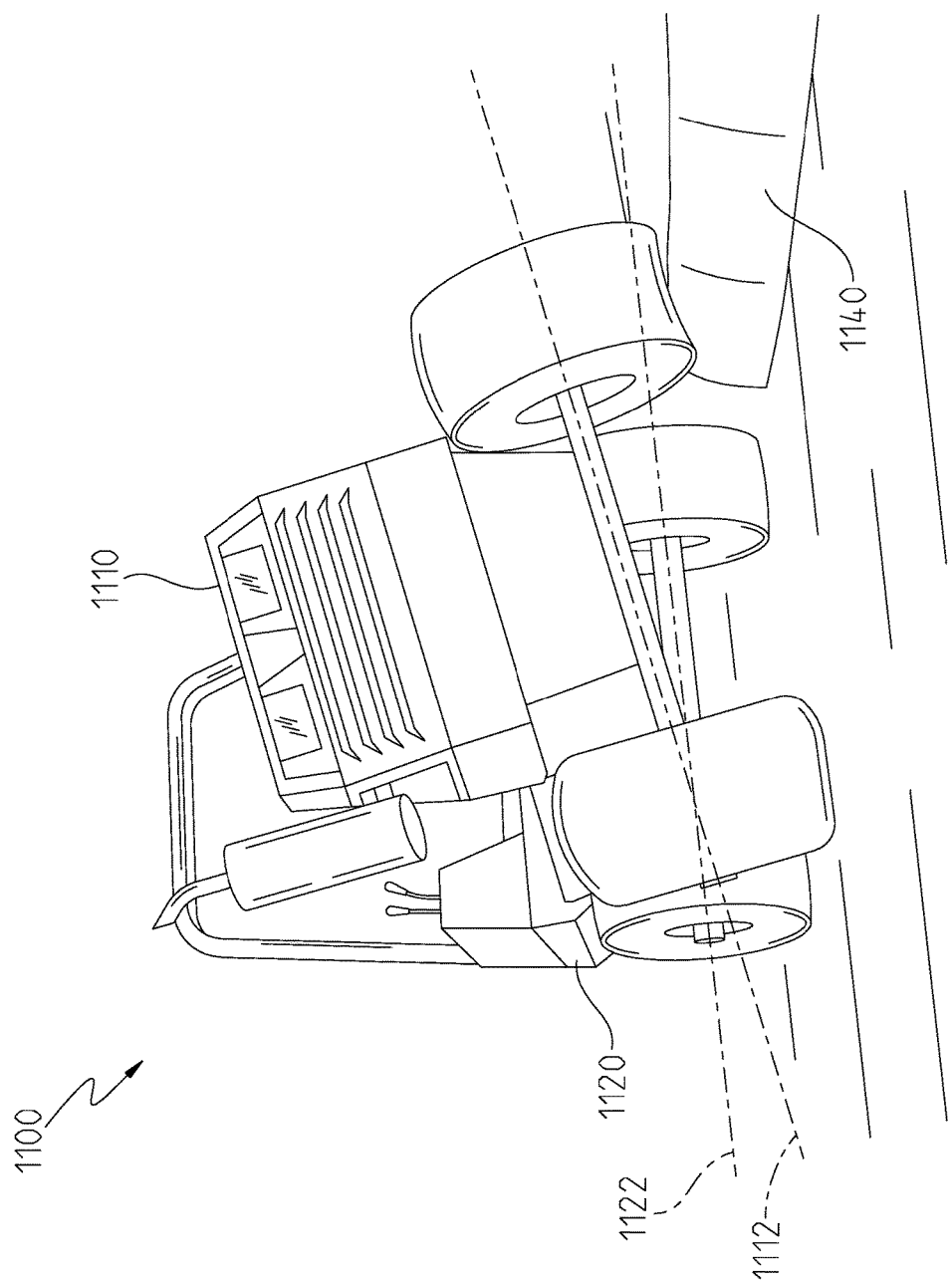
FIG. 11 illustrates driving of an exemplary vehicle on uneven terrain where the vehicle includes a front section and a rear section connected by an oscillation joint.

Additional functionality may be gained by the application of an oscillation brake during transport operations. The suspension system could be more effective, potentially resulting in greater system durability and/or improved ride characteristics for the operator. Applying or locking the oscillation brake could positively influence the spring-mass equations relevant to suspension performance. In addition to the front section of a vehicle being susceptible to rolling over when lifted off the ground by the rear section of a vehicle during a dumping operation, the front section could also roll significantly or even roll over due to uneven terrain. FIG. 11 illustrates a vehicle 1100 that includes a front section 1110 and a rear section 1120 connected by an oscillation joint. When encountering uneven terrain, for example a curb 1140, the front section 1110 rolls about the oscillation joint relative to the rear section 1120. When on level ground, a front axis 1112 passing through an axle of the front section 1110 is generally parallel with a rear axis 1122 passing through an axle of the rear section 1120. However, the uneven terrain causes rotation about the oscillation joint which causes the front axis 1112 to change in angle relative to the rear axis 1122. A frame angle can be calculated as the difference between the angles of the front axis 1112 and the rear axis 1122. It can be appreciated that if the terrain is sufficiently uneven, the front section 1110 of the vehicle could roll over on its side.

Figure 12:
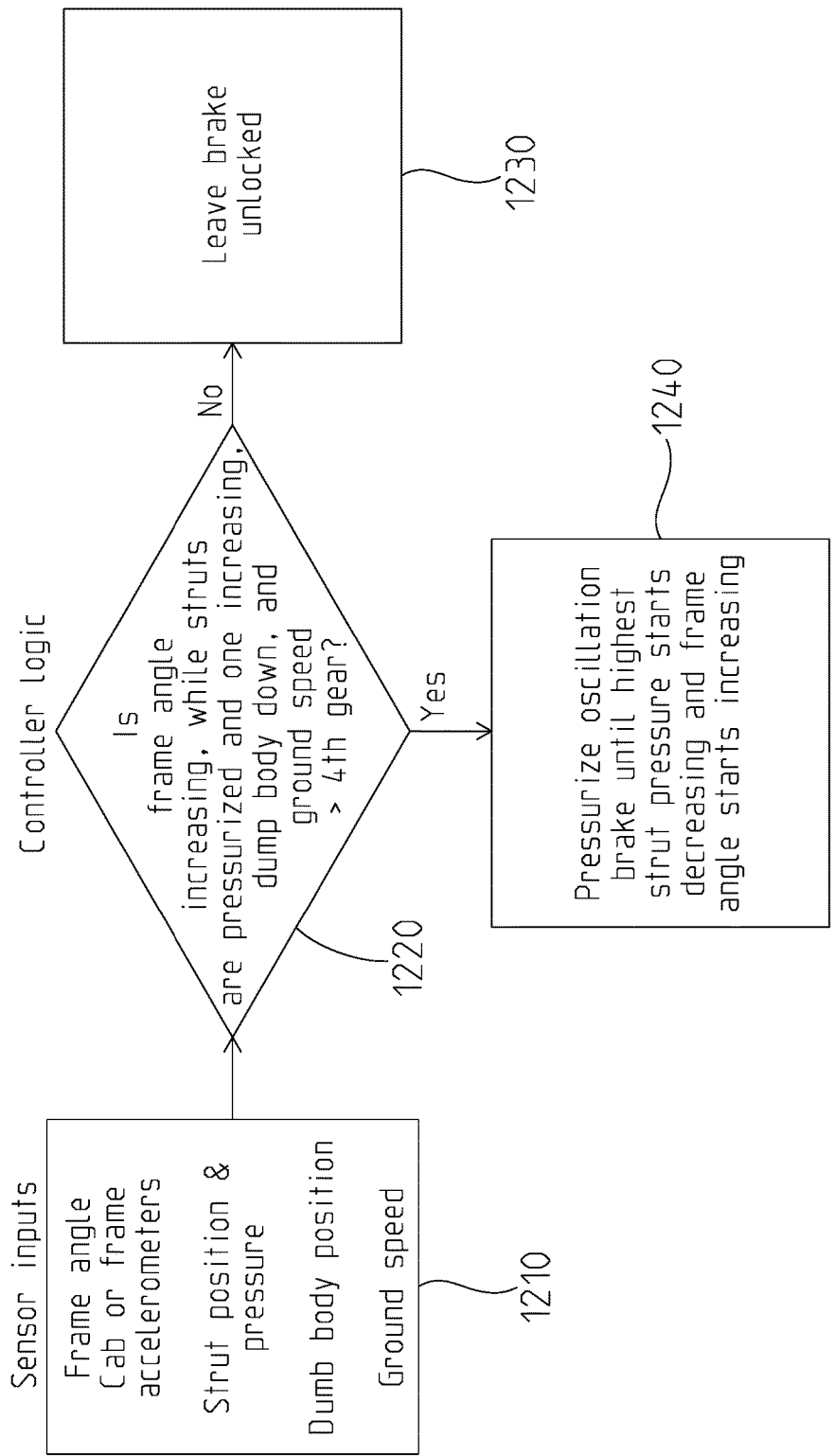
FIG. 12 illustrates a flow diagram for power head section stabilization for a vehicle while driving.

FIG. 12 illustrates a flow diagram for power head section stabilization for a vehicle while driving. At block 1210 the controller receives sensor inputs which can include, for example, a frame angle sensor reading for the front frame 102 and the rear frame 104, accelerometer readings for a component of the power head section 110 that would be lifted, front strut position and/or pressure sensor readings, dump body position readings for a vehicle with a dump body, and ground speed readings for the vehicle. At block 1220; based on the sensor inputs, the controller determines if the frame angle of the front section 1110 relative to the rear section 1120 is increasing while the front struts 210, 212 are pressurized and one of the front struts 210, 212 is increasing in pressure, and the dump body 142 is down and the ground speed of the vehicle is at or above some speed threshold, for example at or above fourth gear. If all of these conditions are met, then at block 1240, the controller starts increasing the force in the oscillation brake until the front strut 210, 212 with the highest pressure starts decreasing and the difference in frame angle between the front section 1110 and rear section 1120 starts decreasing. If all of these conditions are not met, then at block 1230, the controller leaves the oscillation brake unlocked. The amount of force applied in the oscillation brake can be a function of the ground speed of the vehicle, and/or of one or more of the other parameters checked at block 1220.

Locking or pressurizing the oscillation brake can also improve the ride quality for the operator in the front section 1110 of the vehicle. When the oscillation brake is unlocked and one of the front wheels hits a bump, that wheel reacts to the bump based upon the inertial mass of the front section 1110. However, when the oscillation brake is locked and one of the front wheels hits a bump, that wheel reacts to the bump based upon the combined inertial mass of the front and rear sections 1110, 1120. And when the oscillation brake is pressurized and one of the front wheels hits a bump, that wheel reacts to the bump based upon the inertial mass of the front section 1110 plus some percentage of the inertial mass of the rear sections 1120 where the percentage depends upon the amount of pressurization of the oscillation brake between unlocked (0%) and locked (100%).

The oscillation brake can also be used in other scenarios to help prevent excessive rotation of the operator cab besides when the front wheels leave the ground and the front section rolls. For example, the rear section of the vehicle could be located on a slope positioning the left and right wheels above or below one another. When the dump body is raised while the vehicle is in this position, the rear section could start to roll. In this situation, the oscillation brake could be unlocked or released so the front vehicle section and operator cab do not roll along with the rear section of the vehicle.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. An oscillation brake system for a vehicle having a front vehicle section coupled to a rear vehicle section with an oscillation joint that allows the front vehicle section to rotate about an oscillation axis relative to the rear vehicle section, and the front vehicle section includes a front frame; the oscillation brake comprising:
a front oscillation brake section rigidly coupled to the front vehicle section;
a rear oscillation brake section rigidly coupled to the rear vehicle section, the rear vehicle section having multiple degrees of freedom of movement relative to front vehicle section including rotation about the oscillation axis;
at least one sensor providing sensor readings regarding the vehicle; and
a controller receiving the sensor readings;
wherein the at least one sensor includes an accelerometer providing accelerometer readings regarding the direction and magnitude of acceleration of the front frame;
wherein the controller activates the oscillation brake based on the sensor readings;
wherein when the oscillation brake is activated the front oscillation brake section engages the rear oscillation brake section causing greater resistance against the front vehicle section rotating about the oscillation axis relative to the rear vehicle section.

2. The oscillation brake system of claim 1, wherein when the oscillation brake is activated the front oscillation brake section locks with the rear oscillation brake section preventing the front vehicle section from rotating about the oscillation axis relative to the rear vehicle section.

3. The oscillation brake system of claim 1, wherein the rear vehicle section includes a dump body for carrying material in the rear vehicle section and dumping material from the rear vehicle section; and
wherein the at least one sensor further includes a dump body position sensor providing position readings regarding the dump body.

4. The oscillation brake system of claim 1, wherein the front vehicle section further includes a front axle, a front strut coupling the front frame and the front axle; and
wherein the at least one sensor further includes a strut sensor providing strut sensor readings regarding a pressure or position of the front strut.

5. The oscillation brake system of claim 4, wherein the rear vehicle section includes a dump body for carrying material in the rear vehicle section and dumping material from the rear vehicle section; and
wherein the at least one sensor further includes a dump body position sensor providing position readings regarding the dump body, and a ground speed sensor for the vehicle; and
wherein the controller activates the oscillation brake to lock the front oscillation brake section with the rear oscillation brake section to prevent the front vehicle section from rotating about the oscillation axis relative to the rear vehicle section when the accelerometer readings indicate the front frame is accelerating upward, and the strut sensor readings indicate both of the front struts are extending and/or depressurizing, and the dump body position sensor indicates the dump body is rising, and the ground speed sensor indicates the vehicle ground speed is below a speed threshold.

6. The oscillation brake system of claim 1, wherein the front vehicle section further includes a front axle, a right-side front strut and a left-side front strut, the right-side and left-side front struts coupling the front frame to the front axle; and
wherein the rear vehicle section includes a rear frame and a rear axle; and
wherein the at least one sensor further includes a frame angle sensor providing frame angle sensor readings regarding the difference between a front axle angle and a rear axle angle, and a ground speed sensor for the vehicle; and
wherein the controller activates the oscillation brake to force the front oscillation brake section against the rear oscillation brake section to resist the front vehicle section from rotating about the oscillation axis relative to the rear vehicle section when the accelerometer readings indicate the front frame is accelerating upward, and the frame angle sensor readings indicate the difference between the front axle angle and the rear axle angle is above an angle threshold, and the ground speed sensor indicates the vehicle ground speed is above a speed threshold.

7. The oscillation brake system of claim 6, wherein the controller commands the oscillation brake to force the front oscillation brake section against the rear oscillation brake section to resist the front vehicle section from rotating about the oscillation axis relative to the rear vehicle section when the frame angle sensor readings indicate the difference between the front axle angle and the rear axle angle is above the angle threshold and increasing.

8. The oscillation brake system of claim 6, wherein the controller commands the oscillation brake to force the front oscillation brake section against the rear oscillation brake section to resist the front vehicle section from rotating about the oscillation axis relative to the rear vehicle section when the ground speed sensor indicates the vehicle ground speed is above the speed threshold and increasing.

9. An oscillation brake system for a vehicle having a front vehicle section coupled to a rear vehicle section with an oscillation joint that allows the front vehicle section to rotate about an oscillation axis relative to the rear vehicle section, the oscillation brake system comprising:
a front oscillation brake section rigidly coupled to the front vehicle section, where the front oscillation brake section includes an oscillation brake hub splined to a separator plate; and
a rear oscillation brake section rigidly coupled to the rear vehicle section, the rear vehicle section having multiple degrees of freedom of movement relative to front vehicle section including rotation about the oscillation axis, where the rear oscillation brake section includes an oscillation brake housing splined to a friction plate; and wherein when the oscillation brake is activated the oscillation brake hub and the separator plate of the front oscillation brake section are forced against the oscillation brake housing and the friction plate of the rear oscillation brake section causing greater resistance against the front vehicle section rotating about the oscillation axis relative to the rear vehicle section.

10. The oscillation brake system of claim 9, wherein the oscillation brake hub and the separator plate are forced against the oscillation brake housing and the friction plate by hydraulic pressure.

11. The oscillation brake system of claim 9, wherein the oscillation brake hub and the separator plate are forced against the oscillation brake housing and the friction plate by spring pressure.

12. The oscillation brake system of claim 9, wherein the front vehicle section includes a front frame, the oscillation brake system further comprising:
an accelerometer providing accelerometer readings regarding the direction and magnitude of acceleration of the front frame, the accelerometer readings being used to determine when to activate the oscillation brake.

13. The oscillation brake system of claim 9, wherein the front vehicle section includes a front frame, a front axle, and a front strut coupling the front frame and the front axle; the oscillation brake system further comprising:
a strut sensor providing strut sensor readings regarding a pressure or position of the front strut, the strut sensor readings being used to determine when to activate the oscillation brake.

14. The oscillation brake system of claim 9, wherein the front vehicle section further includes a front frame, a front axle, and a front strut that couples the front frame to the front axle, and wherein the rear vehicle section includes a rear frame and a rear axle; the oscillation brake system further comprising:
an accelerometer providing accelerometer readings regarding the direction and magnitude of acceleration of the front frame,
a frame angle sensor providing frame angle sensor readings regarding the difference between a front axle angle and a rear axle angle, and
a ground speed sensor for the vehicle;
wherein the oscillation brake is activated when the accelerometer readings indicate the front frame is accelerating upward, and the frame angle sensor readings indicate the difference between the front axle angle and the rear axle angle is above an angle threshold, and the ground speed sensor indicates the vehicle ground speed is above a speed threshold.

15. An oscillation control method for a vehicle having a front vehicle section and a rear vehicle section coupled by an oscillation joint allowing the front vehicle section to rotate about an oscillation axis relative to the rear vehicle section, the front vehicle section including a front frame, the rear vehicle section having multiple degrees of freedom of movement relative to front vehicle section, the oscillation control method comprising:
receiving vehicle sensor readings, including receiving accelerometer readings regarding the direction and magnitude of acceleration of the front frame;
determining if the front vehicle section requires stabilization based on the vehicle sensor readings;
when the front vehicle section requires stabilization, activating an oscillation brake to resist rotation of the front vehicle section about the oscillation axis relative to the rear vehicle section.

16. The oscillation control method of claim 15, wherein the activating the oscillation brake step comprises locking the oscillation brake to prevent rotation of the front vehicle section about the oscillation axis relative to the rear vehicle section.

17. The oscillation control method of claim 15, wherein the front vehicle section further includes a front axle, a front strut coupling the front frame and the front axle; and
wherein the receiving vehicle sensor readings step further comprises:
receiving strut sensor readings regarding a pressure or position of the front strut.

18. The oscillation control method of claim 17, wherein the rear vehicle section includes a dump body for carrying material in the rear vehicle section and dumping material from the rear vehicle section; and
wherein the receiving vehicle sensor readings step further comprises:
receiving dump body position sensor readings regarding the dump body; and
receiving vehicle ground speed readings for the vehicle; and
wherein the determining if the front vehicle section requires stabilization step comprises determining if the accelerometer readings indicate the front frame is accelerating upward, and the strut sensor readings indicate both of the front struts are extending and/or depressurizing, and the dump body position sensor readings indicate the dump body is rising, and the vehicle ground speed readings indicate the vehicle ground speed is below a speed threshold.

19. The oscillation control method of claim 15, wherein the front vehicle section further includes a front axle; and wherein the rear vehicle section includes a rear frame and a rear axle; and
wherein the receiving vehicle sensor readings step further comprises:
receiving front axle angle readings regarding an angle of the front axle;
receiving rear axle angle readings regarding an angle of the rear axle; and
receiving vehicle ground speed readings for the vehicle; and
wherein the determining if the front vehicle section requires stabilization step comprises:
computing a frame angle based on the difference between the front axle angle readings and the rear axle angle readings; and
determining if the accelerometer readings indicate the front frame is accelerating upward, and the frame angle is above an angle threshold, and the vehicle ground speed readings are above a speed threshold.

20. The oscillation control method of claim 19, wherein the activating an oscillation brake step comprises:
increasing resistance to rotation of the front vehicle section about the oscillation axis relative to the rear vehicle section as a function of the magnitude of the difference between the frame angle and the angle threshold and as a function of the magnitude of the difference between the vehicle ground speed readings and the speed threshold.

* * * * *